US012328254B2

(12) United States Patent
Na et al.

(10) Patent No.: US 12,328,254 B2
(45) Date of Patent: Jun. 10, 2025

(54) ROUTING USING PARTIAL MESSAGE PARSING

(71) Applicant: Niantic, Inc., San Francisco, CA (US)

(72) Inventors: Piaw Na, Mountain View, CA (US); Renana Yacobi, Kenmore, WA (US)

(73) Assignee: Niantic, Inc., San Francisco, CA (US)

( * ) Notice: Subject to any disclaimer, the term of this patent is extended or adjusted under 35 U.S.C. 154(b) by 370 days.

(21) Appl. No.: 17/845,506

(22) Filed: Jun. 21, 2022

(65) Prior Publication Data

US 2022/0407804 A1 Dec. 22, 2022

Related U.S. Application Data

(60) Provisional application No. 63/213,088, filed on Jun. 21, 2021.

(51) Int. Cl.
*H04L 45/302* (2022.01)
(52) U.S. Cl.
CPC ................. *H04L 45/3065* (2013.01)
(58) Field of Classification Search
CPC .................................................. H04L 45/3065
See application file for complete search history.

(56) References Cited

U.S. PATENT DOCUMENTS 7,058,683 B1    6/2006   Belissent et al.
7,826,482 B1 *  11/2010  Minei ............... H04L 45/3065
                                                    370/467
2002/0068584 A1* 6/2002  Gage ................. H04L 61/4557
                                                    455/445
2004/0015596 A1  6/2004  Sapuram et al.
2004/0160917 A1* 8/2004  Eliznd ................ H01Q 1/246
                                                    370/389
2007/0171924 A1  7/2007  Eisner et al.
(Continued)

FOREIGN PATENT DOCUMENTS

EP          1499404 B1    5/2007
TW        201123807 A    7/2011
(Continued)

OTHER PUBLICATIONS

Ekendahl, N. "Ada code generation support for Google Protocol Buffers," In: degree of master, Linköping University, Department of Computer and Information Science, Nov. 2013, sections 2.2.2-2.2.3, pp. 11-14.
(Continued)

*Primary Examiner* — James P Duffy
(74) *Attorney, Agent, or Firm* — Fenwick & West LLP

(57) ABSTRACT

A message router partially decodes messages to determine how to route the messages. The message router receives a message and identifies a field of the message as a candidate field for including an envelope identifier that indicates an envelope type of the message. The envelope type of the message indicates where information, such as where to route the message, is stored within the message. The message router attempts to decode the candidate field to determine whether the candidate field includes the envelope identifier, and responsive to the candidate filed including the envelope identifier, the message router determines the envelope type of the message. The message router routes the message according to the envelope type.

20 Claims, 4 Drawing Sheets

(56) References Cited

U.S. PATENT DOCUMENTS

| | | |
|---|---|---|
| 2014/0029430 A1 | 1/2014 | Samuels et al. |
| 2016/0149917 A1 | 5/2016 | Matthieu et al. |
| 2017/0085512 A1 | 3/2017 | Bray et al. |
| 2017/0163694 A1 | 6/2017 | Skuratovich et al. |
| 2018/0165173 A1 | 6/2018 | Lin et al. |

FOREIGN PATENT DOCUMENTS

| | | |
|---|---|---|
| WO | WO 2008/052340 A1 | 5/2008 |
| WO | WO-2021/027949 A1 | 2/2021 |

OTHER PUBLICATIONS

Jayathilaka, H. et al. "Improved Server Architecture for Highly Efficient Message Mediation," In: IIWAS'13: Proceedings of International Conference on Information Integration and Web-based Applications & Services, Dec. 2, 2013, pp. 418-427.

PCT International Search Report and Written Opinion, PCT Application No. PCT/IB2022/055730, Sep. 26, 2022, 9 pages.

Sucha, M. BC., "Testing Framework for HelenOS," In: Master's thesis, Comenius University in Bratislava Faculty of Mathematics, Physics and Informatics, 2013, pp. 6-13, 27-43.

Taiwan Patent Office, Office Action, Patent Application No. 111122970, Feb. 18, 2023, 22 pages.

European Patent Office, Extended European Search Report and Opinion, EP Patent Application No. EP 22827789.3, Mar. 19, 2025, 10 pages.

* cited by examiner

ROUTING USING PARTIAL MESSAGE PARSING

CROSS REFERENCE TO RELATED APPLICATIONS

The application claims the benefit of U.S. Provisional Application No. 63/213,088, filed Jun. 21, 2021, which is incorporated by reference.

FIELD

The present disclosure relates generally to message routing, and in particular to methods of decoding and routing messages in computer networks.

BACKGROUND

Computer networks are interconnected sets of computing devices that exchange data, such as the internet. Exchanges of messages including data may be made for a number of applications, including augmented reality applications, where properly routing messages is enabled maintaining a state of an application. However, different messages may have different formats that result in the routing information being located in different positions within the message. Fully decoding a message to identify the type and routing data takes a significant amount of processing time, introducing lag into the data flow, which can be detrimental to the performance of applications.

SUMMARY

Augmented reality (AR) systems supplement views of the real world with computer-generated content. Incorporating AR into a parallel-reality game may improve the integration between the real and virtual worlds. AR may also increase interactivity between players by providing opportunities for them to participate in shared gaming experiences in which they interact. For example, in a tank battle game, players might navigate virtual tanks around a real-world location, attempting to destroy each other's tanks. The movement of the tanks may be limited by real-world geography (e.g., the tanks move more slowly through rivers, move more quickly on roads, cannot move through walls, etc.).

Existing AR session techniques may use message routers that are unable to determine how to route all types of messages. For instance, some messages, such as protocol buffers, do not include metadata describing the type of message the messages are, which message routers need to determine how to route the messages. If a message router tried to fully decode a message for routing, the message router may take a significant amount of time to decode the message, increasing latency for the AR session and causing a visible lag for users connected in the AR session. Similar problems exist in other use cases where messages are sent via a network in multiple formats.

This and other problems may be addressed by partially decoding messages during routing at a message router. Latency may be reduced by only decoding necessary portions of the messages to determine how to properly route the messages. This is advantageous in not only routing messages to the correct recipients but also maintaining backwards compatibility at the message router In one embodiment, a method for routing a message in a network includes receiving a message at a message router, such as a cell tower, intermediary node, or other network connection. The message may include one or more fields in an envelope and a payload. The message router identifies a field of the message as a candidate field for including an envelope identifier that indicates an envelope type of the message. The message router attempts to decode the field to determine whether the field includes the envelope identifier. If the message router is unable to determine an envelope type or identify a candidate field, the message router sequentially inspects fields of the message to identify the envelope identifier. If the field includes the envelope identifier, the message router determines the envelope type of the message, which indicates how to route the message, and the message router routes the message according to the envelope type.

One advantage of the routing messages using the method described is that the message router may retrofit message envelopes into existing protocol buffers. Thus, even if the message with the message envelope was not designed with a protocol to be routable by such a method, the message router may add message envelopes to these messages so the message router may employ the method for routing.

DETAILED DESCRIPTION

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. Wherever practicable similar or like reference numbers are used in the figures to indicate similar or like functionality. Where elements share a common numeral followed by a different letter, the elements are similar or identical. The numeral alone refers to any one or any combination of such elements.

Example Computing Environment

Figure 1:
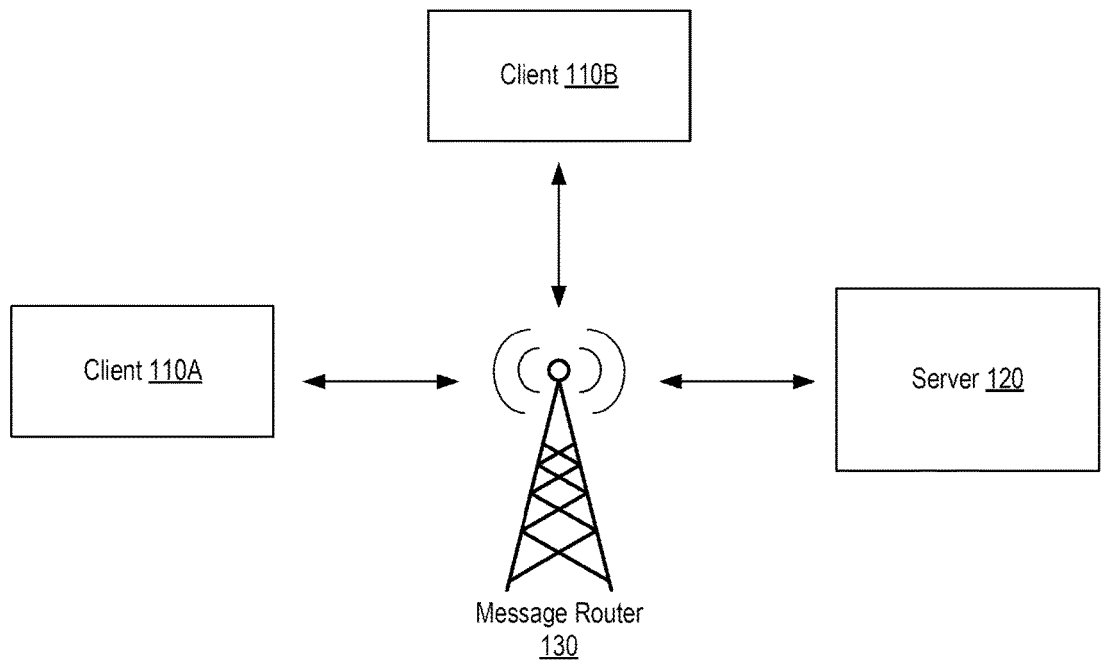
FIG. 1 illustrates an environment for a message router, according to one embodiment.

FIG. 1 illustrates an environment 100 (also referred to as a computer network herein) for a message router 130, according to one embodiment. The figure illustrates a simplified example using block figures for purposes of clarity. The environment 100 includes two clients 110A and 110B, a server 120, and a message router 130. In other embodiments, the environment 100 may include fewer, additional, or other components, such as additional clients 110, servers 120, message routers 130, or other network nodes. For example, although the message router 130 is shown as being at a cell tower, the environment 100 may be a local area network (LAN) using one or more WiFi routers as the message router 130, etc. In another example, the server 120 may be a game server which hosts a parallel-reality game. The clients 110 may communicate with the game server 120 and communicate with one another during the parallel-reality game as players interact with other players of the parallel-reality game.

A client 110 is a computing device such as a personal computer, laptop, tablet computer, smartphone, or so on. Clients 110 can communicate messages via the message router 130. The server 120 is similarly a computing device capable of sending and receiving messages. Clients 110 and the server 120 may send messages to one another. In an embodiment, each client 110 includes a local AR module, and the server 120 includes a master AR module. Each local AR module communicates AR data to local AR modules upon other clients 110 or the master AR module upon the server 120.

The server 120 may be a computing device that establishes connections between clients 110 to receive and transmit information. For example, the server 120 may receive and transmit messages that are routed via the message router 130. In some embodiments, the server 120 is a game server that hosts a parallel-reality game played by various clients 110. The game server 120 may store player profiles, game states, maps (real and virtual), and other information relevant to the parallel-reality game.

The message router 130 is a network node that serves as an intermediary node for end nodes such as clients 110 and server 120. As described above, in other embodiments, the environment 100 may include other network nodes replacing or in addition to a message router 130 but enabling similar routing of messages. The message router 130 increases the range over which messages may be communicated. For example, a client 110A may send a message to a message router 130 which proceeds to transmit the message to a client 110B, where client 110A would not have been able to communicate with client 110B without the message router 130.

In an embodiment, client 110 communications may be routed through the server 120 or peer-to-peer (P2P). Communications routed through the server 120 may go from a first client 110A to the server 120 via the message router 130 and then back through the message router 130 to a second client 110B. In contrast, P2P communication may go from the first client 110A to the message router 130 and then directly to the second client 120B. Note that in some cases, the communications may pass through other intermediary devices, such as signal boosters. As used herein, a communication is considered P2P if it is routed to the target client 110B without passing through the server 120. For example, a message may be sent P2P if the target client 110B is connected to the same message router 130 as the sending client 110A and routed via the server 120 otherwise. In another embodiment, clients 110 communicate entirely using P2P.

In one embodiment, the clients 110 use a coordination service (e.g., hosted at the server 120 and communicated with via transmission control protocol {TCP}) to synchronize IP addresses. The clients 110 can then communicate (e.g., via user datagram protocol {UDP}) using public facing IP addresses or a local area network (LAN). For example, a first client 110A might send a request via TCP to the coordination service to join a local AR shared environment. The coordination service may provide the first client 110A with the IP address of a second client 110B connected to the AR environment (e.g., via the same message router 130). The coordination service may also provide the first client's IP address to the second client 110B or the first client 110A may provide it directly using the second client's IP address (as provided by the coordination service). In some embodiments, the coordination service may prompt the second client 110B to approve the first client 110A (e.g., by requesting user confirmation or checking a list of approved clients 110 to connect with the second client 110B) before the second client's IP address is provided.

Figure 2:
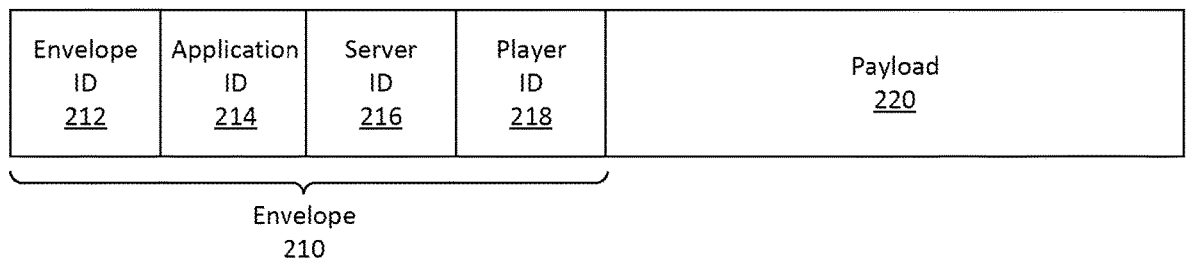
FIG. 2 illustrates a message including an envelope and a payload, according to one embodiment.

FIG. 2 illustrates a message 200 including an envelope 210 and a payload 220, according to one embodiment. The envelope 210 of the message 200 includes one or more identifiers (or "IDs"), each stored in a separate field in the envelope 210. Each identifier may indicate information about the message, such as an envelope type of the message or an application, server, or player that sent or is meant to receive the message. The envelope type of the message 200 may be associated with information about which bytes of the message 200 correspond to routing information, as is described further below. The message 200 of FIG. 2 includes an envelope ID 212 in a first field, application ID 214 in a second field, server ID 216 in a third field, and player ID 218 in a fourth field. In some embodiments, the message 200 may include any number of identifiers of various types (e.g., a client ID) in various orders other than the order shown in FIG. 2. For example, the message 200 may include a client ID in a first field, envelope ID 212 in a second field, and server ID 216 and not include a player ID 218 at all.

The envelope identifier 212 may indicate the envelope type of the message 200, thus can be associated with information about which bytes in the fields of the message 200 correspond to the routing information. For example, this information may be stored in an index or datastore, which the message router 130 may query to retrieve the information to access the routing information. The envelope identifier 212 is in a length delimited field. A length delimited field includes a value at the beginning of the field indicating a length of the field. Thus, by determining whether a field of the message 200 is length delimited, the message router 130 determines whether the field can be a candidate for including an envelope identifier 212 that is associated with routing information. If a field is not length delimited, the message router 130 can determine that it does not include the envelope identifier 212.

In one embodiment, the message router 130 receives messages 200 from client 110A, client 110B, or server 120, and determines how to route each message 200. For instance, the message router 130 identifies a field of the message 200 as a candidate for including an envelope identifier 212 that indicates the envelope type. The message router 130 may assess a first field of the message 200 to determine if the field is length delimited or not. The message router 130 may assess the one or more fields of the message 200 from the first field in a sequential order. The message router 130 may write the first field to an internal forwarding buffer upon determining that the first field is not length delimited and assess a next field of the message 200. The message router 130 may iterate upon checking if the field is length delimited, sending the checked field to the forwarding buffer, and assessing a next field until the message router 130 has found a length delimited field within the message 200.

Responsive to determining that the first field (or a subsequent field after iteration) is length delimited, the message router 130 selects the field as a candidate field. The message router 130 attempts to decode the field to determine whether the field includes an envelope identifier 212. If the message router 130 cannot decode the field into a valid envelope identifier, it writes the field to the forwarding buffer and processes the next field (e.g., by determining whether the next field is length delimited and, if so, if it can be decoded to a valid envelope identifier). If the message router 130 determines that the field includes a valid envelope identifier 212, the message router 130 determines the envelope type of the message 200 using the envelope identifier 212. The message router 130 may route the message 200 using the envelope type. In particular, the message router 130 may extract the routing information from the location or locations within the message 200 indicated by the envelope type, write the remainder of the message to the forwarding buffer, and forward some or all of the message to a destination in the environment 100 using the routing information. For example, the message router 130 may forward the entire message 200, just the payload 220, or some other subset of the fields in the message. This process is further described in relation to FIG. 4 below.

Example Intermediary Node

Figure 3:
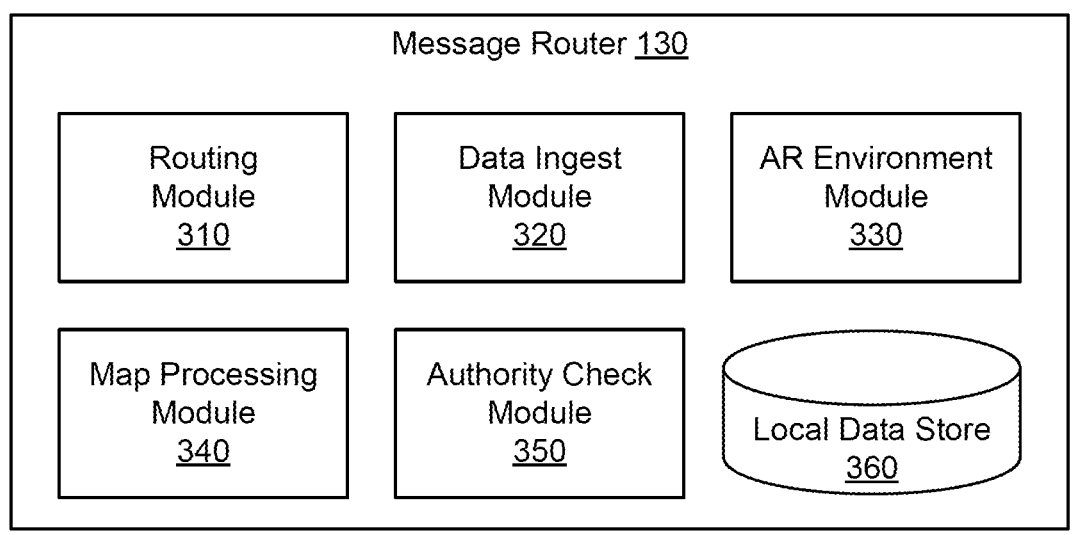
FIG. 3 is a block diagram illustrating the message router of FIG. 1, according to one embodiment.

FIG. 3 is a block diagram illustrating one embodiment of a message router 130. In the embodiment shown, the message router 130 includes a routing module 310, a data ingest module 320, an AR environment module 330, a map processing module 340, an authority check module 350, and a local data store 360. The message router 130 also includes hardware and firmware or software (not shown) for establishing connections to the server 120 and clients 110 for exchanging data. For example, the message router 130 may connect to the server 120 via a fiberoptic or other wired internet connection and clients 110 using a wireless connection (e.g., 4G or 5G). In other embodiments, the message router 130 may include different or additional components. In addition, the functions may be distributed among the elements in a different manner than described.

The routing module 310 receives messages 200 and sends those messages to one or more recipient devices (e.g., clients 110 and server 120). In one embodiment, the routing module 310 receives messages 200 from clients 110 and uses the method described with reference to FIG. 4 to determine where to send the received messages. The routing module 310 may also receive messages from the server 120 addressed to either particular clients 110 or all clients 110 that are connected to the message router 130. The routing module 310 forwards the messages 200 to the clients 110 or servers 120 to which they are addressed, which the routing module 310 may identify from a player ID 218, server ID 216, or client ID.

The data ingest module 320 receives data from one or more sources that the message router 130 uses to provide a shared AR experience to players via the connected clients 110. In one embodiment, the data ingest module 320 receives real-time or substantially real-time information about real-world conditions (e.g., from third party services). For example, the data ingest module 320 may periodically (e.g., hourly) receive weather data from a weather service indicating weather conditions in the geographic area surrounding the message router 130. As another example, the data ingest module 320 might retrieve opening hours for a park, museum, or other public space. As yet another example, the data ingest module 320 may receive traffic data indicating how many vehicles are travelling on roads in the geographic area surrounding the message router 130. Such information about real-world conditions may be used to improve the synergy between the virtual and real worlds.

The AR environment module 330 manages AR environments in which players in the geographic area surrounding the message router 130 may engage in shared AR experiences. In one embodiment, a client 110 connects to the message router 130 while executing an AR game and the AR environment module 330 connects the client to an AR environment for the game. All players of the game who connect to the message router 130 may share a single AR environment or players may be divided among multiple AR environments. For example, there may be a maximum number of players in a particular AR environment (e.g., ten, twenty, one hundred, etc.). Where there are multiple AR environments, newly connecting clients 110 may be placed in a session randomly or the client may provide a user interface (UI) to enable the player to select which session to join. Thus, a player may elect to engage in an AR environment with friends. In some embodiments, players may establish private AR environments that are access protected (e.g., requiring a password or code to join).

In various embodiments, to enable AR objects (e.g., creatures, vehicles, etc.) to appear to interact with real world features (e.g., to jump over obstacles rather than going through them), the AR environment module 330 provides connected clients 110 with map data representing the real world in the proximity of the client (e.g., stored in the local data store 360). The AR environment module 330 may receive location data for a client 110 (e.g., a GPS location) and provide map data for the geographic area surrounding the client (e.g., within a threshold distance of the client's current position).

The received map data can include one or more representations of the real world. For example, the map data can include a point cloud model, a plane matching model, a line matching model, a geographic information system (GIS) model, a building recognition model, a landscape recognition model, etc. The map data may also include more than one representation of a given type at different levels of detail. For example, the map data may include two or more point cloud models, each including different number of points.

The client 110 may compare the map data to data collected by one or more sensors to refine the client's location. For example, by mapping the images being captured by a camera on the client 110 to a point cloud model, the client's location and orientation may be accurately determined (e.g., to within one centimeter and 0.1 degrees). The client 110 provides the determined location and orientation back to the AR environment module 330 along with any actions taken by the player (e.g., shooting, selecting a virtual item to interact with, dropping a virtual item, etc.). Thus, the AR environment module 330 can update the status of the game for all players engaged in the AR environment.

The map processing module 340 updates map data based on current conditions (e.g., data from the data ingest module 320). Because the real world is not static, the map data in the local data store 360 may not represent current real-world conditions. For example, the same park trail in Vermont may look very different in different seasons. In summer, the trail might be clear and the surrounding trees will be covered in foliage. In contrast, in winter, the trail may be blocked by drifts of snow and the trees may be bare. The map processing module 340 may transform the map data to approximate such changes.

In one embodiment, the map processing module 340 retrieves current condition data to identify a transformation and applies that transformation to the map data. The transformations for different conditions may be defined by heuristic rules, take the form of trained machine-learning models, or use a combination of both approaches. For example, the map processing module 340 might receive current weather condition data, select a transformation for the current weather conditions, and apply that transformation to the map data. Alternatively, the map processing module 340 may pre-calculate the transformed maps and store them (e.g., in the local data store 360). In this case, when a client 110 connects to the message router 130, the map processing module determines the current conditions, selects the appropriate pre-calculated version of the map data, and provides that version to the client.

The authority check module 350 maintains synchronization between game states of different clients 110. In one embodiment, the authority check module 350 confirms that game actions received from clients 110 are consistent with the game state maintained by the AR environment module 330. For example, if two players both try to pick up the same in-game item, the authority check module 350 determines which player receives the item (e.g., based on timestamps associated with the requests).

The authority check module 350 may also maintain synchronization between its copy of the state of the AR environment (an intermediate node state) and a master state maintained by the server 120. In one embodiment, the authority check module 350 periodically (e.g., every 1 to 10 seconds) receives global updates regarding the state of the AR environment from the server 120. The authority check module 350 compares these updates to the intermediate node state and resolves any discrepancies. For example, if a player's request to pick up an item was initially approved by the authority check module 350 but a game update from the server 120 indicates the item was picked up by another player (or otherwise made unavailable) before the player attempted to pick it up, the authority check module 350 might send an update to the player's client 110 indicating the item should be removed from the player's inventory.

This process may provide value for clients 110 located close to a boundary between coverage provided by different message routers 130. In this case, players connected to different message routers 130 may both be able to interact with the same virtual element. Thus, each individual message router 130 might initially approve conflicting interactions with the element, but the sever 120 would detect the conflict and send updates to resolve the conflict (e.g., instructing one of the message routers 130 to revoke its initial approval of the action and update its local state accordingly).

The local data store 360 is one or more non-transitory computer-readable media configured to store data used by the message router 130. In one embodiment, the stored data may include map data, current conditions data, a list of currently (or recently) connected clients 110, a local copy of the game state for the geographic region, etc. Although the local data store 360 is shown as a single entity, the data may be split across multiple storage media. Furthermore, some of the data may be stored elsewhere in the communication network and accessed remotely. For example, the message router 130 may access current condition data remotely (e.g., from a third-party server) as needed.

Example Method

Figure 4:
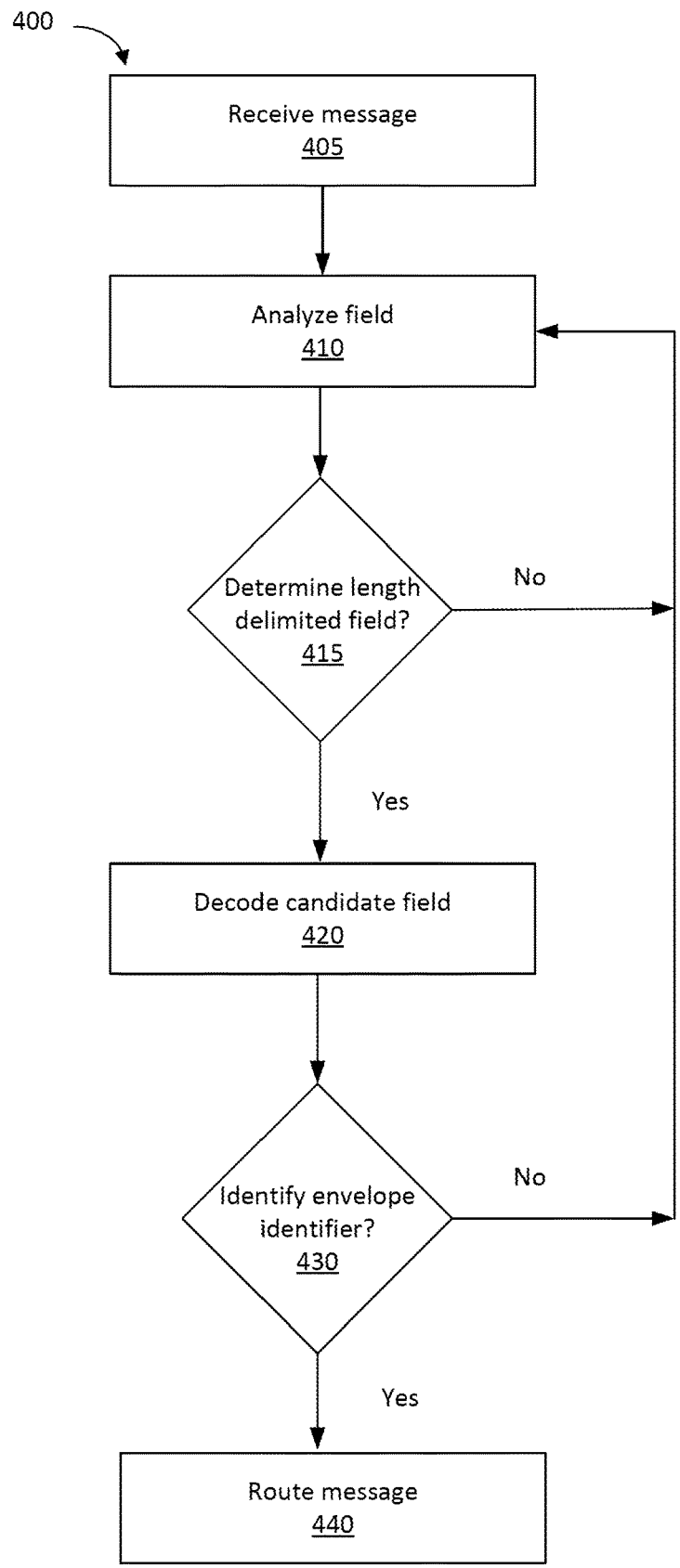
FIG. 4 illustrates a process for routing a message based on an envelope identifier, according to one embodiment.

FIG. 4 illustrates a process 400 for routing a message 200 based on an envelope identifier 212, according to one embodiment. A message router 130 receives 405 a message 200, which may include an envelope 210 and payload 220, each including one or more fields of one or more bytes. The message 200 may describe an action that occurred in a shared AR environment, such as one associated with a parallel-reality game in which players' locations in the real world correlates with their positions in the game world. The message router 130 may be an intermediary node such as a cell tower or another network node connected in the environment 100 of FIG. 1. The message 200 may have been sent to the message router 130 from a client device 110, such as client 110B, or another network node, such as server 120.

The message router 130 identifies a field of the message 200 as a candidate field for including an envelope identifier 212. The envelope identifier 212 indicates which fields or bytes of the message 200 correspond to certain information. For example, an envelope identifier 212 may indicate that the first field of the message 200 includes a player identifier 218 and a second field of the message 200 includes an application identifier 214. In another example, the envelope identifier 212 may indicate the envelope type of the message 200 and can be used to extract the routing information from the field or fields within the message 200 indicated by the envelope type.

In various embodiments, to identify the field that includes the envelope identifier 212, the message router 130 analyzes 410 the one or more fields of the message 200 to identify a candidate field by determining 415 if a field is length delimited. The message router 130 may analyze 410 a message one field at a time sequentially from beginning to end. Alternatively, the message router 130 may analyze 410 the fields in other orders based on, e.g., location, number of bytes, length, etc. of the field of the message 200.

Regardless of the precise approach used to determine which fields to analyze and in what order, the message router 130 may decode a start byte of the first field to be analyzed to determine 415 whether the first field is length delimited. If the first field is length delimited, the message router 130 selects the first field as a candidate field. Conversely, a field that is not length delimited cannot include the envelope identifier. Thus, if the field is not length delimited, the message router 130 does not select the field as a candidate field and instead writes the field to a forwarding buffer without attempting to decode the field. The message router then analyzes 410 a next (sequential) field of the message 200 to determine whether it is a candidate for including the envelope identifier 212. For example, prior to identifying a field as a candidate field for including the envelope identifier, the message router 130 may determine that a previous field (e.g., before the candidate field in the message 200) is not length delimited and write the previous field to the forwarding buffer without decoding the previous field.

The message router 130 attempts to decode 420 a candidate field to determine whether the field includes the envelope identifier 212. In one embodiment, the message router 130 compares the data in the candidate field to an index of identifiers to determine whether the data identifies a valid message type. Alternatively, envelope identifiers 212 may include a predetermined code (e.g., a specified string of characters) so the message router 130 may determine whether the candidate field is the envelope identifier 212 by determining whether the data in the candidate field includes the predetermined code.

Regardless of the method used to determine whether the candidate field includes the envelope identifier 212, if the candidate field does not include the envelope identifier, the message router 130 writes the candidate field to the forwarding buffer and proceed to analyze 410 another field (e.g., the next field in the message 200) to determine a new candidate field. In contrast, if the message router 130 is able to identify 430 an envelope identifier 212 in the candidate field, the message router 130 then determines an envelope type of the message 200 based on the envelope identifier 212. For instance, the message router 130 may query an index stored in the local data store 360 for an envelope type associated with the envelope identifier 212. The envelope type indicates a structure of the envelope 210 of the message 200, including, for example, which bytes (or fields) of the message correspond to routing information for the message 200. Based on the determined envelope type, the message router 130 can obtain the routing information. In some embodiments, the message router 130 may write the remainder of the message (e.g., the candidate and fields after the candidate) to the forwarding buffer. The message router 130 routes 440 the message 200 based on the routing information indicated by the envelope type. To route 440 the message 200, the message router 130 may extract a subset of the fields (e.g., the payload 220) from the message 200 and forward just the extracted fields to a destination in the environment 100 (e.g., client 110, server 120, etc.).

The process 400 shown in FIG. 4 may improve the performance of the message router 130. For instance, traditional message routers may need to deserialize full messages to identify routing information. This consumes memory and processing resources at the message router 130 and may impact performance of the message router 130 (e.g., due to runtime memory paging or lack of available memory, etc.). In contrast, the process 400 may begin processing messages that are transmitted in fragments before the full message is received. The message router 130 can fetch fields used for message routing from a partially received message (a message fragment) and determine routing decisions before receiving the remaining fragments of the message. Even where all of the fragments have been received, the message router 130 may identify routing information without first reconstructing the full message.

The message router 130 may also modify messages for routing in a multitude of ways. In one embodiment, the message router 130 may split two or more serialized internal data structures from a message to send to one or more destinations. In another embodiment, the message router 130 may add or remove fields from messages for routing, such as by adjusting embedded application programming interface (API) keys or adding context to the message for tracing the message. In yet another embodiment, the message router 130 may alter schema of messages. For example, the message router 130 may add a geographic location of a sender of the message (or other contextual information) to the message if the destination of the message is a system that does not support multi-regional architecture.

The process 400 provides an advantageous method for routing messages. The message router 130 may retrofit message envelopes 210 into existing protocol buffers. Thus, even if the message 220 with the message envelope 210 was not designed with a protocol to be routable by such a method, the message router 130 may add message envelopes 210 to these messages 220 so the message router 130 may employ the method for routing.

The process 400 in FIG. 4 may be further illustrated in relation to an example shared AR environment that is incorporated into a parallel reality game where players throw balls of light at one another, which other players dodge or catch in real-time. When a sending player, associated with client 110B in this example, throws a ball of light at a target player, associated with client 110A, the client 110B creates a message 200 describing the action (e.g., throwing the ball of light). The action is between players, so the client 110B indicates in the message 200 a player identifier 218 for the target player of client 110A. The client 110B sends the message 200 to the message router 130, which determines how to route 440 the message 200. The message router 130 sequentially inspects fields of the message 200 to find a length delimited field and attempts to decode 420 the length delimited field to identify 430 an envelope identifier 212 within the field. If the message router 130 is unable to decode 420 the field, the message router 130 continues sequentially inspecting the fields until the message router 130 finds a field with the envelope identifier 212. The message router 130 determines an envelope type based on the envelope identifier 212 and routes the message based on the envelope type to the client 110A of the target player. The client 110A integrates the data from the payload 220 of the message 200 into the local state of the shared AR environment (e.g., shows the target player that the sending player threw a ball of light at them). By not fully decoding the message 200 to identify the message type (and thus identify the routing information), the latency may be reduced.

Figure 5:
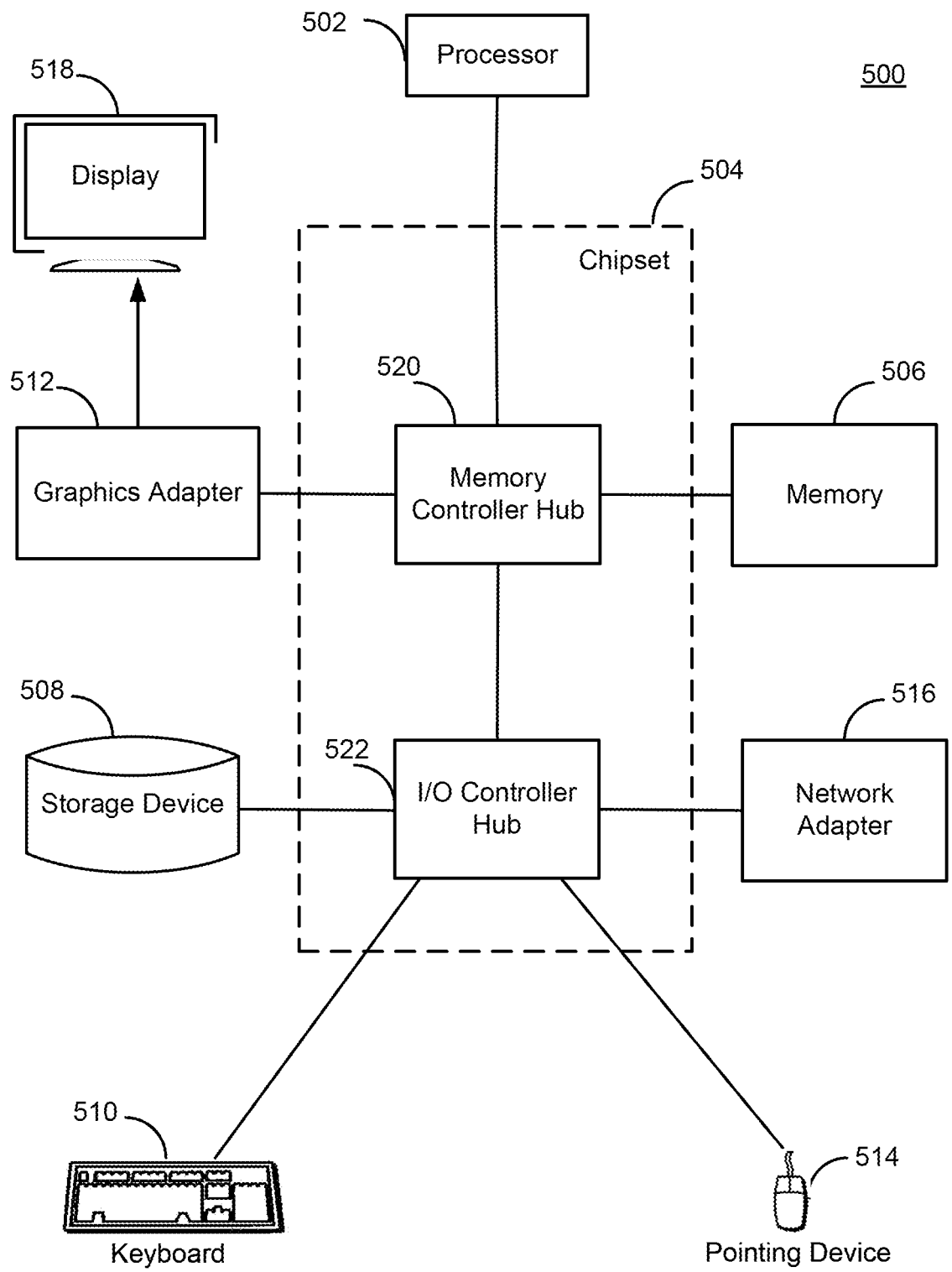
FIG. 5 is a high-level block diagram illustrating an example computer suitable for use within the computer network shown in FIG. 1, according to an embodiment.

FIG. 5 is a high-level block diagram illustrating an example computer 500 suitable for use within the computer network shown in FIG. 1, according to an embodiment. The example computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and is used in combination with the keyboard 510 (which may be an on-screen keyboard) to input data into the computer system 500. The graphics adapter 512 displays images and other information on the display 518. The network adapter 516 couples the computer system 500 to one or more computer networks.

The types of computers used by the entities of FIG. 1 can vary depending upon the embodiment and the processing power required by the entity. For example, a server 120 might include a distributed database system comprising multiple blade servers working together to provide the functionality described. Furthermore, the computers can lack some of the components described above, such as keyboards 510, graphics adapters 512, and displays 518.

Those skilled in the art can make numerous uses and modifications of and departures from the apparatus and techniques disclosed herein without departing from the described concepts. For example, components or features illustrated or described in the present disclosure are not limited to the illustrated or described locations, settings, or contexts. Examples of apparatuses in accordance with the present disclosure can include all, fewer, or different components than those described with reference to one or more of the preceding figures. The present disclosure is therefore not to be limited to specific implementations described herein, but rather is to be accorded the broadest scope possible consistent with the appended claims, and equivalents thereof.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs that may be used to employ the described techniques and approaches. Thus, while particular embodiments and applications have been illustrated and described, it is to be understood that the described subject matter is not limited to the precise construction and components disclosed. The scope of protection should be limited only by the following claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for routing a message in a network, the method comprising:
    receiving the message at a message router;
    identifying a field of the message as a candidate field for including an envelope identifier, the envelope identifier indicating an envelope type of the message, wherein identifying the field of the message as the candidate field comprises:
        determining whether the field is length delimited; and
        responsive to the field being length delimited, selecting the field as the candidate field;
    decoding the candidate field to determine whether the candidate field includes the envelope identifier;
    responsive to the candidate field including the envelope identifier, determining the envelope type of the message; and
    routing the message according to the envelope type.

2. The method of claim 1, further comprising:
    prior to identifying the field as the candidate field for including the envelope identifier, determining that a second field in the message is not a length delimited field; and
    writing the second field to a forwarding buffer without decoding the second field.

3. The method of claim 2, further comprising: responsive to the candidate field including the envelope identifier, writing a remainder of the message to the forwarding buffer.

4. The method of claim 1, further comprising:
    prior to identifying the field as the candidate field for including the envelope identifier, determining that a third field in the message is length delimited;
    decoding the third field to determine whether the third field includes the envelope identifier; and
    responsive to the third field not including the envelope identifier, writing the third field to a forwarding buffer.

5. The method of claim 4, further comprising: responsive to the candidate field including the envelope identifier, writing a remainder of the message to the forwarding buffer.

6. The method of claim 1, wherein determining whether the field is length delimited comprises decoding a start byte.

7. The method of claim 1, wherein the envelope identifier is indicative of which bytes in the message correspond to routing information.

8. The method of claim 1, wherein routing the message comprises extracting a payload from the message and forwarding the payload to a destination in a network without forwarding remaining fields of the message.

9. A non-transitory computer-readable storage medium storing instructions that, when executed by a processor, cause the processor to perform operations comprising:
  receiving a message at a message router;
  identifying a field of the message as a candidate field for including an envelope identifier, the envelope identifier indicating an envelope type of the message, wherein identifying the field of the message as the candidate field comprises:
    determining whether the field is length delimited; and
    responsive to the field being length delimited, selecting the field as the candidate field:
  decoding the candidate field to determine whether the candidate field includes the envelope identifier;
  responsive to the candidate field including the envelope identifier, determining the envelope type of the message; and
  routing the message according to the envelope type.

10. The non-transitory computer-readable storage medium of claim 9, wherein the operations further comprise:
  prior to identifying the field as the candidate field for including the envelope identifier, determining that a second field in the message is not a length delimited field; and
  writing the second field to a forwarding buffer without decoding the second field.

11. The non-transitory computer-readable storage medium of claim 10, wherein the operations further comprise: responsive to the candidate field including the envelope identifier, writing a remainder of the message to the forwarding buffer.

12. The non-transitory computer-readable storage medium of claim 9, wherein the operations further comprise:
  prior to identifying the field as the candidate field for including the envelope identifier, determining that a third field in the message is length delimited;
  decoding the third field to determine whether the third field includes the envelope identifier; and
  responsive to the third field not including the envelope identifier, writing the third field to a forwarding buffer.

13. The non-transitory computer-readable storage medium of claim 12, wherein the operations further comprise: responsive to the candidate field including the envelope identifier, writing a remainder of the message to the forwarding buffer.

14. The non-transitory computer-readable storage medium of claim 9, wherein determining whether the field is length delimited comprises decoding a start byte.

15. The non-transitory computer-readable storage medium of claim 9, wherein the envelope identifier is indicative of which bytes in the message correspond to routing information.

16. The non-transitory computer-readable storage medium of claim 9, wherein routing the message comprises extracting a payload from the message and forwarding the payload to a destination in a network without forwarding remaining fields of the message.

17. A message router comprising:
  a local data store storing a list of client devices connected to the message router; and
  a routing module configured to perform operations comprising:
    receiving a message at the message router;
    identifying a field as a candidate field for including an envelope identifier, the envelope identifier indicating an envelope type of the message, wherein identifying the field of the message as the candidate field comprises:
      determining whether the field is length delimited; and
      responsive to the field being length delimited, selecting the field as the candidate field;
    decoding the candidate field to determine whether the candidate field includes the envelope identifier;
    responsive to the candidate field including the envelope identifier, determining the envelope type of the message; and
    routing the message according to the envelope type.

18. The message router of claim 17, wherein the operations further comprise:
  prior to identifying the field as the candidate field for including the envelope identifier, determining that a second field in the message is not a length delimited field; and
  writing the second field to a forwarding buffer without decoding the second field.

19. The message router of claim 17, wherein the operations further comprise:
  prior to identifying the field as the candidate field for including the envelope identifier, determining that a third field in the message is length delimited;
  decoding the third field to determine whether the third field includes the envelope identifier; and
  responsive to the third field not including the envelope identifier, writing the third field to a forwarding buffer.

20. The message router of claim 17, wherein routing the message comprises extracting a payload from the message and forwarding the payload to a destination in a network without forwarding remaining fields of the message.

* * * * *